Dec. 19, 1950     W. A. JOHNSTON     2,534,868
HAND TRUCK WITH SELF-COUPLING HOOK
Filed June 28, 1946     2 Sheets-Sheet 2
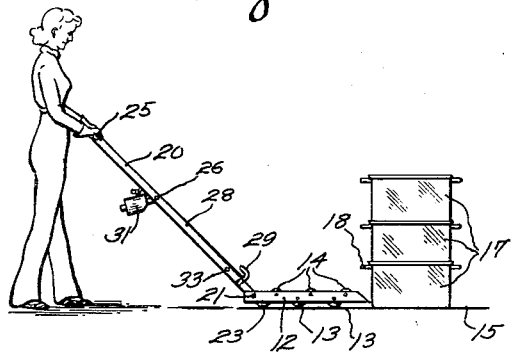
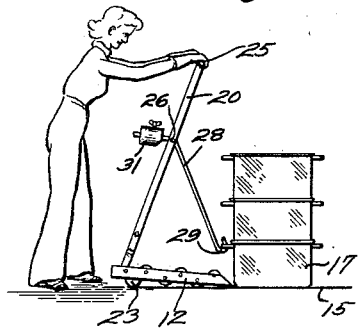
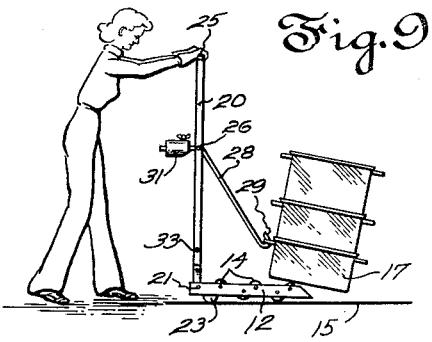
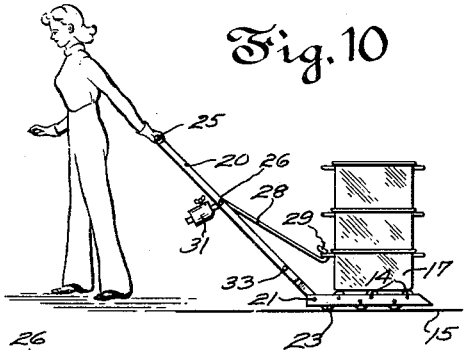
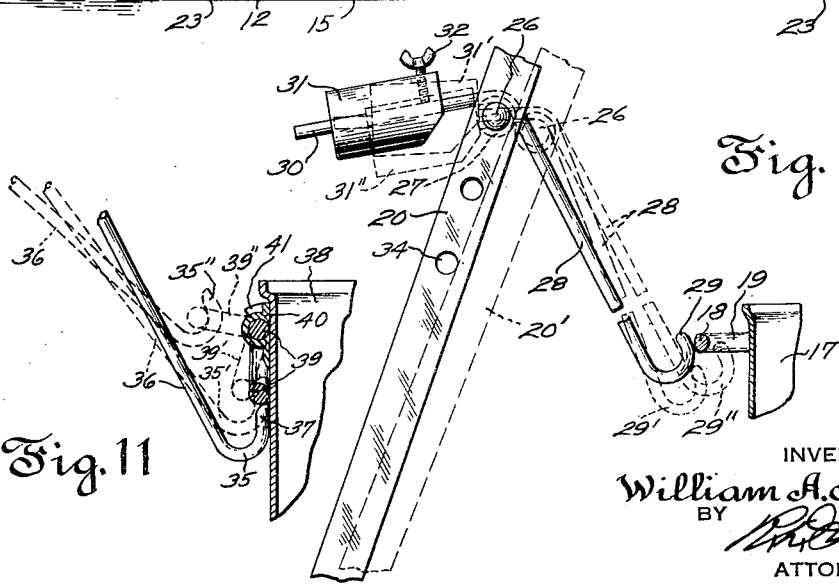
INVENTOR
William A. Johnston
BY
ATTORNEY Patented Dec. 19, 1950

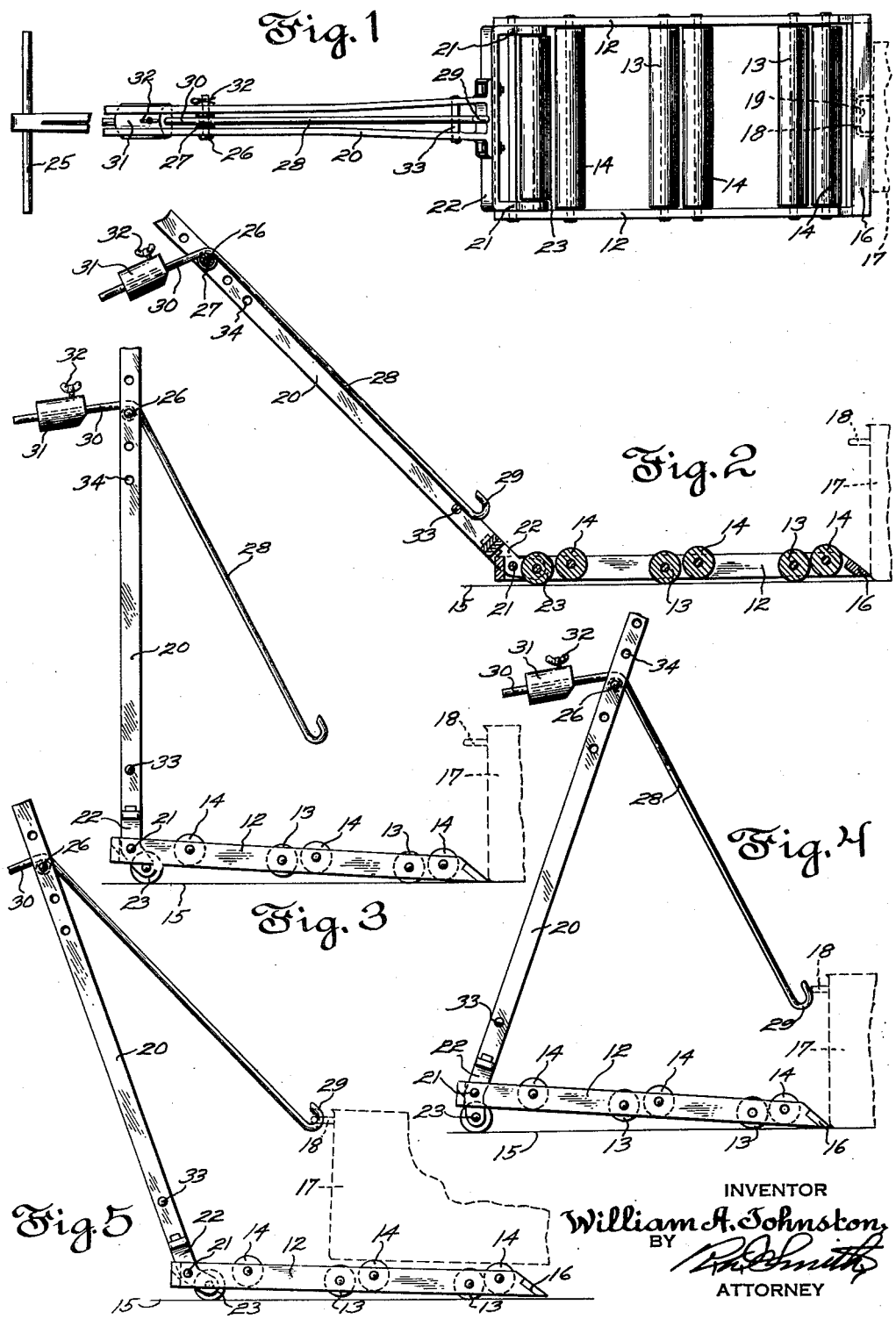

2,534,868

UNITED STATES PATENT OFFICE 2,534,868

HAND TRUCK WITH SELF-COUPLING HOOK

William A. Johnston, Stratford, Conn., assignor to Rolock, Incorporated, Fairfield, Conn., a corporation of Connecticut Application June 28, 1946, Serial No. 680,152

10 Claims. (Cl. 214—65.4)

This invention relates to improvements in hand trucks of the type embodying a wheeled or roller truck chassis and a tow bar lever hinged thereon equipped with a swingable hook to assist in taking on and discharging loads without direct manual handling thereof. Hand trucks of this general type are shown in U. S. Patents No. 2,367,754 granted to A. R. Cole and No. 2,360,799 granted to Guy Slingsby and No. 2,478,196 granted to William A. Johnston et al.

In each of the aforesaid patents an apertured handle fixed on the side of a tote pan comprising the load is designed to be engaged by a hook that is pivotally mounted on the tow bar lever of the truck. Such hook after being manually engaged with the load serves to pull the load or tote pan up onto the truck as a result of swinging the tow bar relatively to the truck chassis. A disadvantage of this arrangement has been that in order to effect operative engagement of the hook with the handle of the tote pan separate manipulation of the hook in addition to swinging of the tow bar lever has been required. This occupies one hand of the operator and leaves free only a single remaining hand for maneuvering the truck. It burdens or exceeds the wrist strength of an operator, especially female shop help, to do this.

An object of this invention is to eliminate the necessity for handling the hook as a separate manual act additional to maneuvering the tow bar lever. Attainment of this object leaves both hands of the operator free to exert the strength necessary to maneuver the truck by means of the tow bar lever while at the same time so swinging the tow bar lever that it causes the hook to engage the load and either pull it onto the truck or discharge it therefrom.

A contributory object is to cause a load engaging hook hinged on the tow bar lever to assume various positions of angularity relative to such lever merely by the manner of swinging the tow bar lever and without separate manipulation of the hook.

A related object is to poise a load engaging hook arm in angular relation to the tow bar lever by counterbalancing its weight through the medium of some preferably adjustable automatic opposing force extraneous to the hook arm such as a counterbalancing weight or a yieldable spring or springs preferably adjustable as to tension.

In general the present improvements provide a more simplified form of load handling truck in which the heel of the truck is first backed up to the handle carrying side of a tote pan by use of the tow bar lever as usual. Then the tow bar lever is swung relatively to the truck chassis backward toward the tote pan as a result of which the counterbalanced hook arm of these improvements becomes automatically coupled to the handle of the tote pan and remains so coupled during reverse or forward swinging of the tow bar lever which drags the tote pan up onto the truck chassis. Thereafter, backward swinging of the tow bar lever will push the tote pan through the medium of the improved counterbalanced hook arm while the latter remains engaged with the tote pan handle and thus shove the tote pan off from the heel end of the truck. The hook will then automatically disengage from the tote pan handle in response to abruptly reversed swinging movement of the tow bar lever so that the truck becomes completely freed from its load without directly touching the hook or hook arm.

The foregoing and other objectives are attained by a successful embodiment of the invention disclosed by the following description in connection with the appended drawings wherein:

Fig. 1 is a plan view of a hand truck embodying the present improvements.

Fig. 2 is a side view of the truck with its heel backed up to the handle-carrying side of a tote pan.

Fig. 3 shows the tow bar lever of Fig. 2 in the course of being swung toward the load.

Fig. 4 shows the tow bar lever swung to a position still nearer to the load wherein the automatically counterbalanced hook is about to engage the handle of the tote pan.

Fig. 5 shows the hook engaged with and in process of pulling the tote pan up onto the truck.

Fig. 6 is an enlarged contracted side view of a portion of the tow bar lever and automatically counterbalanced hook in several of the positions they assume for hooking on to or unhooking from the load.

Figs. 7 to 10, inclusive, show the manner of use of the truck by an operator in pulling a load of tote pans up onto the truck without separately manipulating the automatically counterbalanced load engaging hook.

Fig. 11 illustrates a modified shape of hook in various positions of engagement with a modified type of pan handle.

As in the chassis construction of the trucks of the patents hereinbefore referred to, the present truck may comprise a border frame 12 between whose side bars there are pivotally mounted a pair of traction wheels or ground rollers 13 and a series of preferably three platform wheels or load supporting rollers 14 projecting above the top of frame 12 and permanently elevated above the floor surface 15 on which the truck rolls. The rear or heel end of chassis frame 12 tapers and its wedge-shaped terminus as shown at 16 can be directed to the base corner or floor meeting point of a tote pan 17 on the floor 15 by tilting of truck frame 12. This tilting is accomplished by swinging movement of a tow bar lever 20 which is pivotally hinged at 21 on the front end of chassis frame 12. The swingable lever 20 is rigid with a yoke 22 at its lower end which carries a third traction wheel or ground roller 23 that becomes forced downward with a sort of toggle action as tow bar lever 20 is swung toward the load receiving or heel end of the truck thus tilting chassis frame 12 as described for lowering wedge 16 to the floor at the base edge of the tote pan.

Tow bar lever 20 has the usual rigid cross handle 25 and is equipped intermediate its ends with a hinge pin 26 on which is turnably mounted the hub 27 of a stiff hook arm 28 one of whose ends carries, or is bent to form, load engaging hook 29. Rigid with the same hub 27 there is a radially projecting weight beam 30 slidably carrying the hook counterbalancing weight 31 that is adjustable lengthwise thereof and fastened by a thumb-operated set screw 32. Weight 31 and its carrying beam 30 are extraneous to the hook arm 28 but in practice I may employ a single bent rod to constitute both the hook arm 28 and the weight beam 30 and weld the bend in this rod to a peripheral groove in the hub collar 27 which latter is freely rotatable on hinge pin 26. This hinge pin is removable from tow bar 20 by removing its cotter pin 32 and can be reinserted selectively in different holes 34 spaced along the tow bar.

In operation, the rigid swingable structure consisting of hook 29, hook arm 28, weight beam 30 and weight 31 is free to balance as a unit about the axis of hinge pin 26. Hence regardless of the angular inclination of tow bar lever 20 in relation to the truck chassis the counterbalanced hook seeks to maintain a constant angular relationship to the true vertical or horizontal about its pivot or fulcrum 26, namely that absolute angular disposition in which it is shown in Figs. 3 and 4 and by full lines in Fig. 6. Thus the balanced structure 28—31 possesses static inertia which will give rise to a turning moment about pivot 26 if sudden movement of pivot pin 26 occurs toward the left or toward the right in Fig. 3 as a consequence of swinging the tow bar 20 abruptly in those directions. In swinging the tow bar toward the right, namely rearward toward the load, if the tow bar swinging movement is accelerated just as hook 29 closely approaches pan handle 18, or in other words just before it reaches its full line position in Figs. 4 and 6, then hook 29 will be caused by the aforesaid turning moment to dip momentarily downward to, say, its broken line position 29' before coming into contact with the tote pan handle 18. This lifts weight 31 to position 31' or higher than the normal position in which it is poised. As the tow bar is brought to rest in its broken line position 20' in Fig. 6 weight 31 will sink again and resume its normal position 31" thereby lifting the hook to and past its broken line position 29" until the latter is fully engaged with the pan handle as shown in Figs. 5 and 8. In this manner the load maneuvering device automatically couples itself to the load.

If the hook nose is properly shaped and again starting from the full line position of parts in Figs. 4 and 6, rearward swinging movement of tow bar lever 20 toward the tote pan or load 17, even if performed slowly without acceleration, can cause the nose of the hook to cam itself against the tote pan handle 18 in a manner to force the hook to dip slowly through a series of positions similar to those shown in Fig. 6 until the nose of the hook finds the opening or aperture 19 in handle 18. Thereupon the temporarily elevated or unbalanced weight 31 will come into action to swing the hook arm counterclockwise and lift the hook nose smartly upward into handle aperture 19 causing automatic coupling engagement of the hook with the tote pan handle as before.

When the operator desires to discharge the load from the truck the tow bar lever 20 is swung toward the rear so slowly and deliberately that hook arm 28, instead of swinging clockwise about pivot 26, is kept elevated by weight 31 so that the hook is maintained in coupled engagement with the tote pan handle. This enables hook arm 28 to act, if desired, as a pusher for thrusting the tote pan backward toward the heel or rear end of the truck. Ordinarily, however, the load will tend to roll off the truck of its own weight when the truck chassis becomes tilted as in Figs. 4 and 9.

When the load has been fully discharged, and also if desired while the load pan still remains upon the truck, accelerated rearward swinging movement of tow bar lever 20 will act cooperatively with the inertia of poised structure 28—31 as hereinbefore described momentarily to fling the hook arm clockwise about its pivot pin 21. While the hook is thus momentarily disengaged from the pan handle the operator has time to swing the tow bar forward again before weight 31 is able to effect recoupling engagement of the tote pan handle by the hook. Such disengagement of the hook from the handle will be assisted if the fling of the hook causes the hook nose to strike the side of the tote pan as this will set up a rebound force augmenting the clockwise turning moment of structure 28—31 about pivot 26.

Various kinds of stops may be employed to establish a positive limit to the clockwise swinging of hook arm 28 downward about its pivot 26 in Fig. 2. While a mere cross pin 33 bridging the space between the sides of tow bar 20 is shown as serving this purpose in Fig. 2, such stop abutment can to certain advantage be constructed and arranged to upstand rigid with the tow bar beneath hook arm 28 in position to contact therewith and serve as a rest therefor in its load hauling position in Fig. 10. A stop abutment so provided will by positively resisting lowering of hook arm 28 from its position in Fig. 10 add force to the hereinbefore described function of the hook in starting to push the load or tote pan toward the rear of the truck or toward the right in Fig. 10 when the tow bar in said figure is swung clockwise about its pivot 21.

A spring may be substituted for weight 31 arranged to urge the hook arm counterclockwise about its pivot 26 in the drawings if it is desired to eliminate weight 31 together with its weight beam 30. Such spring may take the form of a coiled band spring having one end connected to tow bar 20 and the other end connected to hook arm 28 or its hub 27 or may take the form of a long helix of spring wire stretched between a spring stud on hub 27 and an anchorage point on tow bar 20 so as to set up a counterclockwise turning moment on hub 27 serving some of the purposes of weight 31. While the torque force of such spring might be substantially a constant in different angular positions of the tow bar, the turning moment exerted on hook arm 28 varies as does the lever arm distance to its center of gravity with respect to a vertical line passing through pivot 26. Hence such spring substituted for weight 31 would comprise an automatic counterbalancing medium connected to arm 28 in a manner yieldably to poise the latter in differing angular relationships to tow bar 20 as the latter assumes differing angular relationships to the truck chassis.

Fig. 11 shows a hook 35 on arm 36 that may be substituted for hook 29 and arm 28 having a modified or wedge shaped nose 37 with blunted tip to prevent its catching on projections on the upright surface of tote pan 38 during upward movement of the hook nose as it wipes against the tote pan. The tote pan in Fig. 11 is equipped with a so-called "drop" handle 39 the same being a stiff loop freely turnable in the hinge clip 40. Normally handle 39 hangs downward as in its full line position close to the side face of the tote pan. By maneuvering solely the tow bar 20 as hereinbefore described, the nose of hook 35 will find and wedge its way upward between handle 39 and the tote pan as indicated in broken line positions of the handle 39' and of the hook 35'. Broken line positions 39'' and 35'' indicate the hook fully engaged with the handle ready to pull the load up onto the truck. The upward swing of the handle is limited to position 39'' by the spur stop 41 that is rigid with the tote pan and that may be integral with hinge clip 40. Several types of tote pan handles that will successfully be engaged automatically by my improved self-coupling hook are shown in detail in the aforesaid patent to Slingsby.

The appended claims are directed to and intended to cover not only the specific constructions and arrangements of parts herein illustrated and described but also all substitutes for and equivalents thereof which are fairly embraced within the definitions of the claims.

I claim:

1. A hand truck for taking on and/or discharging loads without manual handling of the load, including the combination with a truck chassis and a swingable tow bar hinged thereon, of a pivot on said bar, a load maneuvering device constructed and arranged to be self coupling to the load comprising a stiff arm swingably connected at one of its ends to said bar by means of said pivot and carrying at its other end an upwardly turned hook engageable with the load by rising movement relative thereto, together with an automatic counterbalancing medium angularly displaced from said arm about said pivot and connected to said arm in a manner yieldably to poise the latter in normal constant absolute angular disposition while said tow bar assumes various angular relationships to said arm and to said chassis.

2. A hand truck for taking on and/or discharging loads without manual handling of the load, including the combination with a truck chassis and a swingable tow bar hinged thereon, of a pivot on said bar, a load maneuvering device constructed and arranged to be self coupling to the load comprising a stiff arm swingably connected at one of its ends to said bar by means of said pivot and carrying at its other end an upwardly turned hook engageable with the load by rising movement relative thereto, together with an automatic counterbalancing medium angularly displaced from said arm about said pivot and connected to said arm in a manner yieldably to poise the latter in normal constant absolute angular disposition while said tow bar assumes various angular relationships to said arm and to said chassis, said counterbalancing medium including a weight tending yieldingly to maintain said hook carrying arm in said absolute angular disposition during and throughout a range of swinging movement of said tow bar relative to said chassis.

3. A hand truck for taking on and/or discharging loads without manual handling of the load, including the combination with a truck chassis and a swingable tow bar hinged thereon, of a pivot on said bar, a load maneuvering device constructed and arranged to be self coupling to the load comprising a stiff arm swingably connected at one of its ends to said bar by means of said pivot and carrying at its other end an upwardly turned hook engageable with the load by rising movement relative thereto, together with an automatic counterbalancing medium angularly displaced from said arm about said pivot and connected to said arm in a manner yieldably to poise the latter in normal constant absolute angular disposition while said tow bar assumes various angular relationships to said arm and to said chassis, said counterbalancing medium including a weight so operatively related to said hook carrying arm that said hook is positioned automatically by said weight in predetermined relation to a load when the truck is backed up to the load and said tow bar is swung toward the load.

4. A hand truck for taking on and/or discharging loads without manual handling of the load, including the combination with a truck chassis and a swingable tow bar hinged thereon, of a pivot on said bar, a load maneuvering device constructed and arranged to be self coupling to the load comprising a stiff arm swingably connected at one of its ends to said bar by means of said pivot and carrying at its other end an upwardly turned hook engageable with the load by rising movement relative thereto, together with an automatic counterbalancing medium angularly displaced from said arm about said pivot and connected to said arm in a manner yieldably to poise the latter in normal constant absolute angular disposition while said tow bar assumes various angular relationships to said arm and to said chassis, said counterbalancing medium including a weight cooperative with said hook in a manner automatically to be lifted as said hook approaches the load thereby to permit said hook to be lowered momentarily for dipping into coupled engagement with the load.

5. A hand truck for taking on and/or discharging loads without manual handling of the load, including the combination with a truck chassis and a swingable tow bar hinged thereon, of a pivot on said bar, a load maneuvering device constructed and arranged to be self coupling to the load comprising a stiff arm swingably connected at one of its ends to said bar by means of said pivot and carrying at its other end an upwardly turned hook engageable with the load by rising movement relative thereto, together with an automatic counterbalancing medium angularly displaced from said arm about said pivot and connected to said arm in a manner yieldably to poise the latter in normal constant absolute angular disposition while said tow bar assumes various angular relationships to said arm and to said chassis, said counterbalancing medium including a weight beam rigid with said hook carrying arm and a weight on said beam, the inertia of said hook and weight as carried together by said tow bar being such in relation to said pivotally connected end of said hook carrying arm that suddenly reversed flinging of said tow bar causes said hook to dip momentarily in a manner automatically to uncouple from the load.

6. In a hand truck for taking on and discharging loads without direct manual handling of the load, the combination with a truck chassis and a tow bar hinged thereon to be swung into various angular relationships to said chassis, of a fulcrum carried by said tow bar, a device free to swing on said fulcrum including a load engaging arm, a weight, and a weight carrier extraneous to said arm and arranged to support said weight in angularly displaced relation to said arm about said fulcrum thereby automatically to balance said arm in a manner to maintain the latter yieldably in constant equilibrium with respect to said fulcrum while said tow bar occupies its various angular relationships to said chassis, together with means for setting said weight at selective distances from said fulcrum for varying its counterbalancing force upon said load engaging arm.

7. In a hand truck for taking on and discharging loads without direct manual handling of the load, the combination with a truck chassis and a tow bar hinged thereon to be swung into various angular relationships to said chassis, of a fulcrum carried by said tow bar and a device free to swing on said fulcrum, said device including a load engaging arm, a C-shaped hook carried by said arm arranged to open upward in a manner to effect engagement with the load by upward movement and to disengage from said load by downward movement together with a weight, and a weight carrier extraneous to said arm arranged to support said weight in angularly displaced relation to said arm about said fulcrum thereby automatically to balance said arm in a manner to maintain the latter yieldably in constant equilibrium with respect to said fulcrum while said tow bar occupies its various angular relationships to said chassis, said weight and carrier being constructed and arranged automatically to urge said hook normally upward, together with means for setting said weight at selective distances from said fulcrum for varying its counterbalancing force upon said load engaging arm.

8. A hand truck for taking on and/or discharging loads without manual handling of the load, including the combination with a truck chassis and a swingable tow bar hinged thereon, of a load maneuvering device constructed and arranged to be self coupling to the load comprising a stiff arm pivotally connected at one of its ends to said bar and carrying at its other end a hook engageable with the load, together with an automatic counterbalancing medium extraneous to said arm and connected thereto in a manner yieldably to poise the latter in constant absolute angular disposition while said tow bar assumes various angular relationships to said arm and to said chassis, said counterbalancing medium including a weight beam rigid with said hook arm, and a weight on said beam adjustably fastenable to said beam at selective distances from said pivotally connected end of said hook arm, thereby to vary and predetermine said constant absolute angular disposition of the hook arm throughout a range of said angular relationships of said tow bar to said truck chassis.

9. In a hand truck for taking on and discharging loads without manual handling thereof, a truck chassis, a tow bar, hinged thereon, and a two-branch bell crank structure pivotally hung on said tow bar in the manner of a pendulum, one branch of said structure carrying a load engaging hook and the other branch of said structure carrying a weight arranged to counterbalance said hook in a manner to maintain the latter in equilibrium in a position to engage with a load when said tow bar is moved toward said load.

10. In a hand truck for taking on and discharging loads without manual handling thereof, the combination with a truck chassis and a tow bar hinged thereon to be swung into various angular relationships to said chassis, of a fulcrum carried by said tow bar, a device free to swing on said fulcrum including a load engaging arm, and an automatic force applying instrumentality arranged automatically to balance said arm in a manner to maintain the latter yieldably in constant equilibrium with respect to said fulcrum while said tow bar occupies its various angular relationships to said chassis, said balancing instrumentality supplying sufficient force to enable said arm to push against the load responsively to unaccelerated movement of said fulcrum toward the load and insufficient force to prevent said arm from swinging about said fulcrum when accelerated movement is imparted to said fulcrum.

WILLIAM A. JOHNSTON.

REFERENCES CITED

The following references are of record in the file of this patent:

UNITED STATES PATENTS

| Number | Name | Date |
|---|---|---|
| 2,360,799 | Slingsby | Oct. 17, 1944 |
| 2,367,754 | Cole | Jan. 23, 1945 |

FOREIGN PATENTS

| Number | Country | Date |
|---|---|---|
| 783,825 | France | Apr. 15, 1935 |
| 448,395 | Great Britain | June 8, 1936 |